US008977630B1

(12) United States Patent
Tucker

(10) Patent No.: US 8,977,630 B1
(45) Date of Patent: Mar. 10, 2015

(54) PERSONALIZING SEARCH RESULTS

(71) Applicant: Google Inc., Mountain View, CA (US)

(72) Inventor: Paul Tucker, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/027,692

(22) Filed: Sep. 16, 2013

Related U.S. Application Data

(63) Continuation of application No. 11/024,968, filed on Dec. 30, 2004, now Pat. No. 8,538,970.

(51) Int. Cl.
*G06F 17/30* (2006.01)

(52) U.S. Cl.
CPC .................................. *G06F 17/3053* (2013.01)
USPC .......................................................... 707/748

(58) Field of Classification Search
None
See application file for complete search history.

(56) References Cited

U.S. PATENT DOCUMENTS

| | | | |
|---|---|---|---|
| 6,526,440 B1 | 2/2003 | Bharat | |
| 7,031,961 B2 | 4/2006 | Pitkow et al. | |
| 8,538,970 B1 | 9/2013 | Tucker | |
| 2002/0069190 A1 | 6/2002 | Geiselhart | |
| 2003/0004968 A1 | 1/2003 | Romer et al. | |
| 2003/0033288 A1 | 2/2003 | Shanahan et al. | |
| 2003/0093338 A1 | 5/2003 | Kim et al. | |
| 2003/0115187 A1 | 6/2003 | Bode et al. | |
| 2004/0030688 A1 | 2/2004 | Aridor et al. | |
| 2004/0073918 A1 | 4/2004 | Ferman et al. | |
| 2004/0199419 A1 | 10/2004 | Kim et al. | |
| 2004/0205448 A1 | 10/2004 | Grefenstette et al. | |
| 2005/0033742 A1 | 2/2005 | Kamvar et al. | |
| 2005/0071328 A1 | 3/2005 | Lawrence | |
| 2005/0071741 A1 | 3/2005 | Acharya et al. | |
| 2005/0216434 A1 | 9/2005 | Haveliwala et al. | |
| 2005/0222989 A1 | 10/2005 | Haveliwala et al. | |
| 2005/0289456 A1* | 12/2005 | Bier .............................. | 715/513 |
| 2006/0026013 A1* | 2/2006 | Kraft ................................ | 705/1 |
| 2006/0074883 A1 | 4/2006 | Teevan et al. | |
| 2006/0089926 A1 | 4/2006 | Knepper et al. | |
| 2006/0143254 A1 | 6/2006 | Chen et al. | |
| 2007/0276801 A1* | 11/2007 | Lawrence et al. ................. | 707/3 |
| 2008/0319971 A1* | 12/2008 | Patterson .......................... | 707/5 |
| 2012/0095837 A1* | 4/2012 | Bharat et al. ............... | 705/14.54 |

OTHER PUBLICATIONS

Kleinberg, John, "Authoritative Sources in a Hyperlinked Environment," Proceedings of the ACM-SIAM Symposium on Discrete Algorithms, 1998, IBM Research Report RJ 10076, May 1997, 34 pages.
Wikipedia—Kaltix, http://en.wikipedia.org/wiki/Kaltix, Apr. 15, 2013 (print date), 4 pages.

* cited by examiner

*Primary Examiner* — Wilson Lee
(74) *Attorney, Agent, or Firm* — Harrity & Harrity, LLP

(57) ABSTRACT

A system receives a search query from a user and performs a search of a corpus of documents, based on the search query, to form a ranked set of search results. The system re-ranks the set of search results based on preferences of the user, or a group of users, and provides the re-ranked search results to the user.

20 Claims, 6 Drawing Sheets

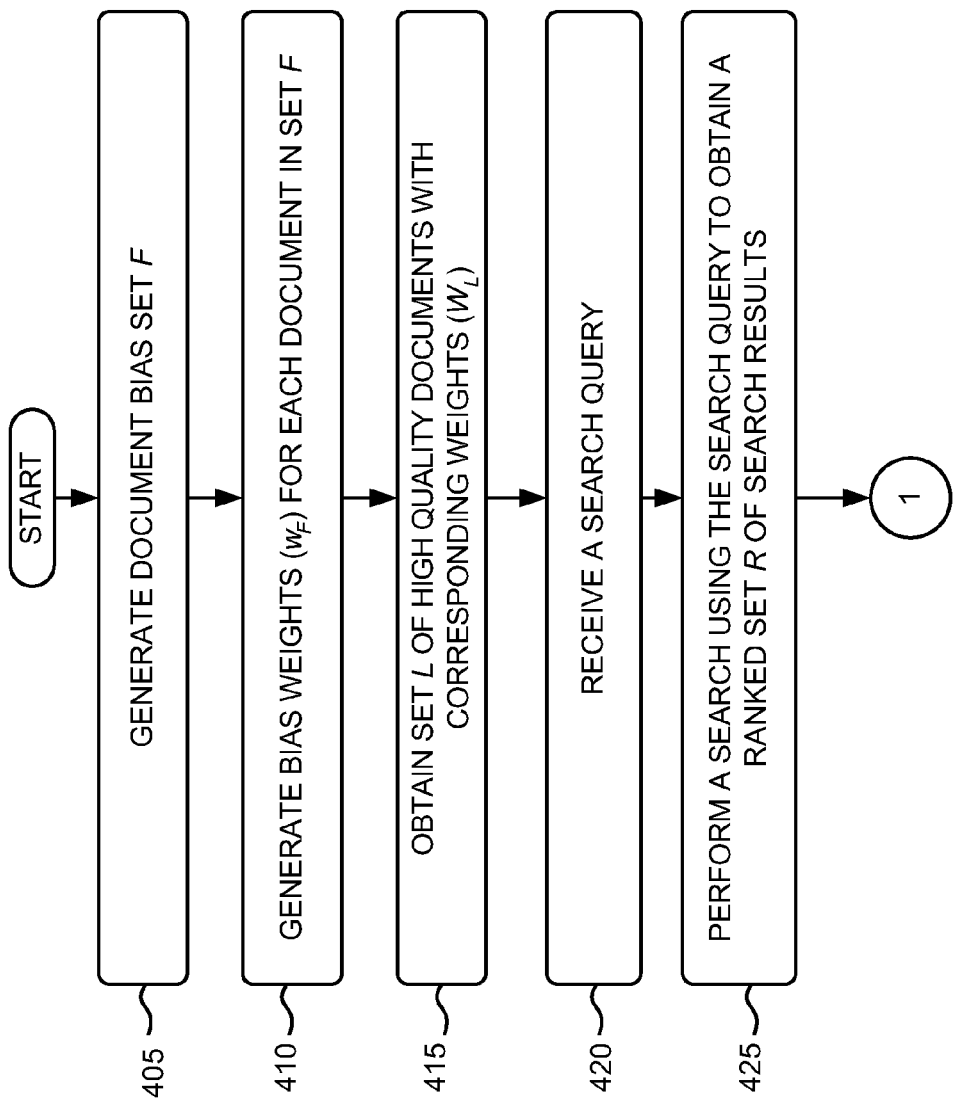

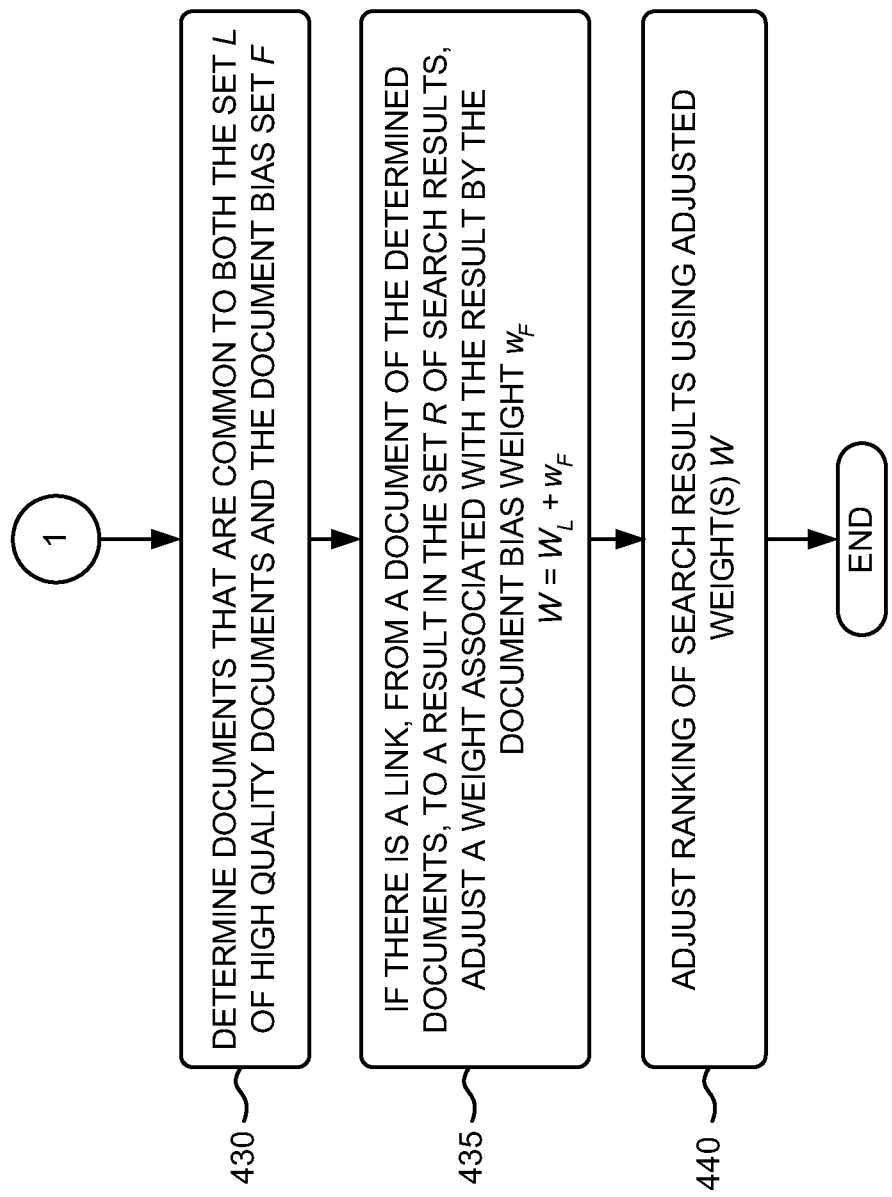

PERSONALIZING SEARCH RESULTS

This application is a continuation of U.S. patent application Ser. No. 11/024,968, filed Dec. 30, 2004 (now U.S. Pat. No. 8,538,970), the disclosure of which is incorporated herein by reference.

BACKGROUND

1. Field of the Invention

Implementations described herein relate generally to information searching and, more particularly, to ranking search results using a global ranking algorithm modified by user preferences.

2. Description of Related Art

Existing information searching systems use search queries to search through aggregated data to retrieve specific information that corresponds to the received search queries. Such information searching systems may search information based locally or in distributed locations. The World Wide Web ("web") is one example of information in distributed locations. The web contains a vast amount of information, but locating a desired portion of that information can be challenging. This problem is compounded because the amount of information on the web, and the number of new users inexperienced at web searching, are growing rapidly.

Search engines attempt to return hyperlinks to web documents in which a user is interested. Generally, search engines base their determination of the user's interest on search terms (e.g., in a search query provided by the user). The goal of the search engine is to provide links to high quality, relevant results to the user based on the search query. Typically, the search engine accomplishes this by matching the terms in the search query to a corpus of pre-stored web documents. Web documents that contain the user's search terms are considered "hits" and are returned to the user.

Search results provided to a user in response to a search query are typically ranked in some fashion to present the more useful, or relevant, documents higher in the list of search results, and to present the less useful, or relevant, documents lower in the list of search results. To rank the results of a search, a global document ranking algorithm, such as, for example, a link-based ranking algorithm, is sometimes used. Link-based ranking may approximate a most-inclusive community estimation of the quality of a document. However, on any given topic there may be sub-communities that would assign greatly different rankings to documents as compared to a global link-based ranking approach. Often, a user would prefer to see results returned in an order that corresponds to the ranking of the sub-community with which his opinions are most congruent. For example, in a query regarding nutrition, one user might want to see results cited by government agencies, while another might prefer results cited by bodybuilding authorities. Existing global document ranking algorithms, thus, do not resolve personal differences in search result ranking

SUMMARY OF THE INVENTION

According to one aspect consistent with the principles of the invention, a method may include receiving a search query from a user and performing a search of a corpus of documents, based on the search query, to form a ranked set of search results. The method may further include re-ranking the set of search results based on preferences of the user, or a group of users, and providing the re-ranked search results to the user.

According to another aspect, a method may include identifying a set of document preferences from a user or a group of users and identifying a set of quality documents globally ranked among multiple documents. The method may further include determining documents common to both the set of document preferences and the set of quality documents and executing a search of a corpus of documents to return a set of search results. The method may also include determining documents of the common documents that have links to one or more results of the set of search results and adjusting ranking of the results based on first quality indicators associated with the documents of the common documents that have links to the one or more results.

BRIEF DESCRIPTION OF THE DRAWINGS

The accompanying drawings, which are incorporated in and constitute a part of this specification, illustrate embodiments of the invention and, together with the description, explain the invention. In the drawings.

FIGS. 4A and 4B are flowcharts of an exemplary process for personalizing search result ranking using global ranking and user preferences.

DETAILED DESCRIPTION

The following detailed description of the invention refers to the accompanying drawings. The same reference numbers in different drawings may identify the same or similar elements. Also, the following detailed description does not limit the invention.

According to aspects of the invention, document ranking computations, as applied to a set of documents resulting from an executed search, may be modified based on a set of user preferences. The set of user preferences may be generated automatically (e.g., from a query history or document browsing history associated with the user), manually (e.g., through user compilation), or both (e.g., through user editing of an automatically generated set of preferences), and may be developed and shared by a community of users of common interest. Consistent with principles of the invention, a search engine, after receiving a set of search results (e.g., from a search query) ranked using a set of quality indicators derived from a global document ranking algorithm, may modify the set of quality indicators based the set of user preferences. The modified quality indicators may be used to re-rank the search results to reflect the user preferences (including both positive and/or negative preferences), thus providing a "personalized" search result ranking.

A "document," as the term is used herein, is to be broadly interpreted to include any machine-readable and machine-storable work product. A document may include an e-mail, a web site, a file, one or more digital images, a combination of files, one or more files with embedded links to other files, a news group posting, a blog, a web advertisement, etc. In the context of the Internet, a common document is a web page.

Web pages often include textual information and may include embedded information (such as meta information, images, hyperlinks, etc.) and/or embedded instructions (such as Javascript, etc.). A "link," as the term is used herein, is to be broadly interpreted to include any reference to or from a document.

Exemplary Overview

Figure 1:
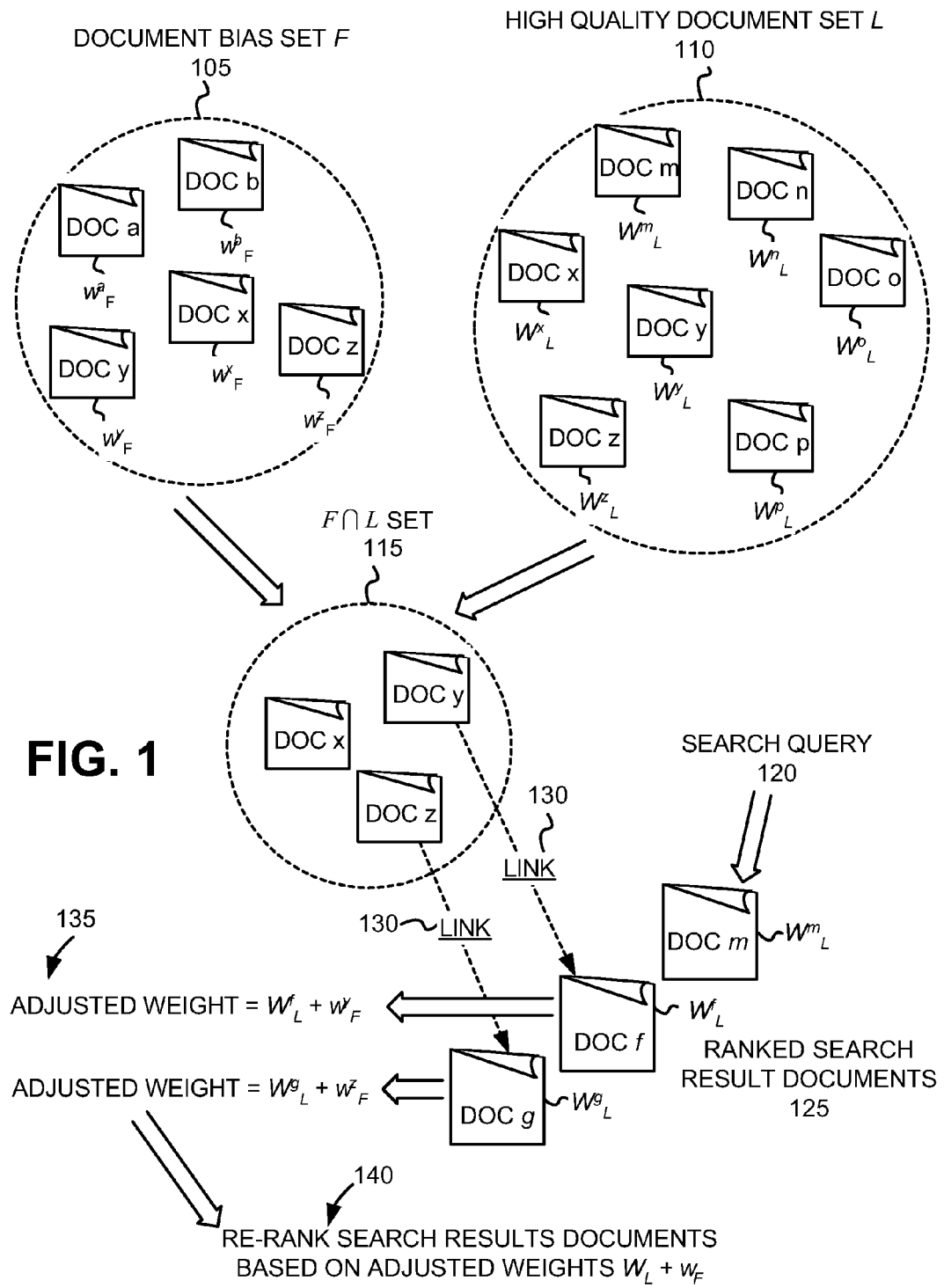
FIG. 1 is a diagram of an overview of an exemplary use of the invention.

FIG. 1 illustrates an overview of the re-ranking of search results based on a user's or group's document or site preferences. In accordance with this aspect of the invention, a document bias set F 105 may be generated that indicates the user's or group's preferred and/or disfavored documents. Bias set F 105 may be automatically collected from a query or browser history of a user. Bias set F 105 may also be generated by human compilation, or editing of an automatically generated set. Bias set F 105 may include a set of documents shared, or developed, by a group that may further include a community of users of common interest. Document bias set F 105 may include one or more designated documents (e.g., documents a, b, x, y and z) with associated weights (e.g. $w^a_F$, $w^b_F$, $w^x_F$, $w^y_F$ and $w^z_F$). The weights may be assigned to each document (e.g., documents a, b, x, y and z) based on a user's, or group's, relative preferences among documents of bias set F 105. For example, bias set F 105 may include a user's personal most-respected, or most-distrusted, document list, with the weights being assigned to each document in bias set F 105 based on a relative quantification of the user's preference among each of the documents of the set.

A high quality document set L 110 may be obtained from any existing document ranking algorithm. Such document ranking algorithms may include a link-based ranking algorithm, such as, for example, Google's PageRank algorithm, or Kleinberg's Hubs and Authorities ranking algorithm. The document ranking algorithm may provide a global ranking of document quality that may be used for ranking the results of searches performed by search engines. High quality document set L 110 may be derived from the highest-ranking documents in the web as ranked by an existing document ranking algorithm. In one implementation, for example, set L 110 may include the top percentage of the documents globally ranked by an existing document ranking algorithm (e.g., the highest ranked 20% of documents). In an implementation using PageRank, set L 110 may include documents having PageRank scores higher than a threshold value (e.g., documents with PageRank scores higher than 10,000,000). Set L 110 may include multiple documents (e.g., documents m, n, o, p, x, y and z) with associated weights (e.g., weights $W^m_L$, $W^n_L$, $W^o_L$, $W^p_L$, $W^x_L$, $W^y_L$ and $W^z_L$). The weights may be assigned to each document (e.g., documents m, n, o, p, x, y and z) based on a relative ranking of "quality" between the different documents of set L 110 produced by the document ranking algorithm.

An intersection of bias set F 105 and quality document set L 110 may then be determined to ascertain which documents are common to both. As shown in FIG. 1, the intersection set F∩L 115 may include the documents (e.g., documents x, y and z) contained in both sets F 105 and L 110.

A search engine (not shown) may receive a search query 120 and, based on search query 120, may return a set R of ranked search result documents 125. The search result documents 125 may be ranked using weights assigned by the document ranking algorithm.

A determination may then be made whether there is a link 130, from a document of the intersection set F∩L 115, to a result in the set R 125 of search results. As shown in FIG. 1, document y has a link 130 to a document (i.e., document f) of search result documents 125, and document z has a link 130 to another document (i.e., document g) of search result documents 125. For each document determined to have a link 130 to a result in set R 125, a weight assigned to a corresponding linked document in search result documents 125 may be adjusted 135 by the weight assigned to the document in bias set F 105. For example, as shown in FIG. 1, bias set F 105 assigns a weight of $w^y_F$ to document y and a weight of $w^z_F$ to document z. Search result document f has a weight of $W^f_L$ assigned to it, and search result document g has a weight of $W^g_L$ assigned to it. The weight assigned to document f may thus be adjusted by the weight assigned to document y in bias set F 105 (e.g., $W=W^f_L+w^y_F$). In a similar manner, the weight assigned to document g may be adjusted by the weight assigned to document z in bias set F 105 (e.g., $W=W^g_L+w^z_F$). Adjustment of the weights assigned to documents in the search result set R 125 may include the use of any type of mathematical function, or combination of functions, such as, for example, using multiplication or other functions, instead of, or in addition to, using just addition alone. In particular, in the situation where bias set F 105 contains multiple documents with each having a link to a search result, then the weight adjustment may be a function of multiple different weights assigned to the multiple documents in bias set F 105.

The set of search result documents 125 may then be re-ranked based on the adjusted weights. For example, since document y has a link to document f in search result documents 125, the adjusted weight $W=W^f_L+w^y_F$ for document y may be used to re-rank document f within the set of search result documents 125. As another example, since document z has a link to document g in search result documents 125, the adjusted weight $W=W^g_L+w^z_F$ for document z may be used to re-rank document g within the set of search result documents 125.

Through the use of a bias set F 105 which incorporates weights that correspond to user preferences, aspects of the invention enable the "promotion," or "demotion," of results within a set of search results that have initially been ranked using existing document ranking algorithms, such as, for example, a link-based ranking algorithm.

FIG. 1 depicts sets 105, 110 and 115 as containing actual documents for illustrative purposes only. In some implementations, sets 105, 110 and 115 may include document identifiers, descriptors, links to the documents, or other types of references to the documents, instead of the actual documents themselves.

Exemplary Network Configuration

Figure 2:
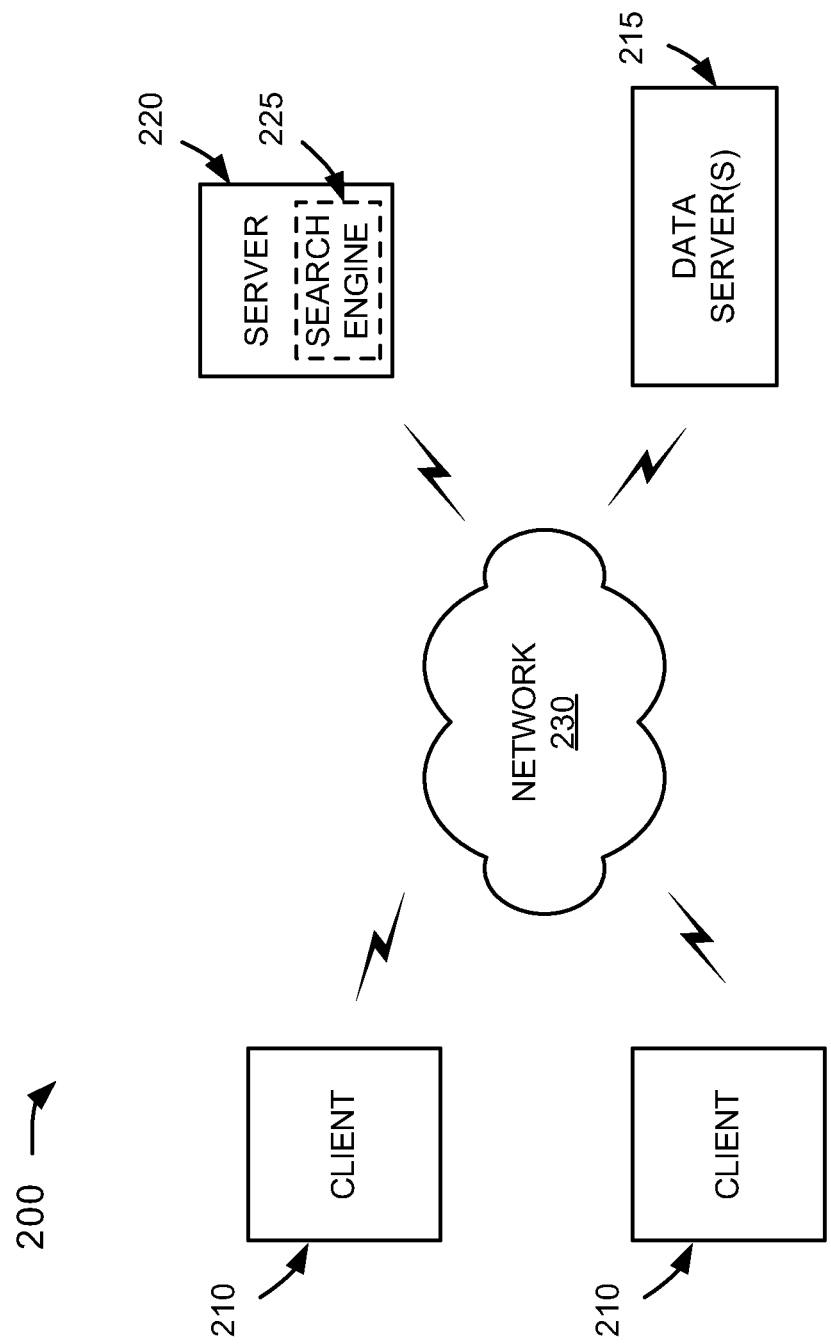
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 215 via a network 230. Network 230 may include a local area network (LAN), a wide area network (WAN), a telephone network, such as the Public Switched Telephone Network (PSTN), an intranet, the Internet, a memory device, or a combination of networks. Two clients 210 and two servers 220 and 215 have been illustrated as connected to network 230 for simplicity. In practice, there may be more or fewer clients and servers. Also, in some instances, a client may perform some functions of a server and a server may perform some functions of a client.

Clients 210 may include client entities. A client entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 215 may include server entities that gather, process, search, and/or maintain documents in a manner consistent with the principles of the invention. Clients 210 and servers 220 and 215 may connect to network 230 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on data server(s) 215 and store information associated with these documents in a repository of crawled documents. The data aggregation service may be implemented in other ways, such as by agreement with the operator(s) of data server(s) 215 to distribute their hosted documents via the data aggregation service. Search engine 225 may execute a query, received from a user, on the corpus of documents hosted on data server(s) 215, and may rank the documents resulting form the executed query.

Server(s) 215 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites.

While servers 220 and 215 are shown as separate entities, it may be possible for one or more of servers 220 and 215 to perform one or more of the functions of another one or more of servers 220 and 215. For example, it may be possible that two or more of servers 220 and 215 are implemented as a single server. It may also be possible for a single one of servers 220 or 215 to be implemented as two or more separate (and possibly distributed) devices.

Exemplary Client/Server Architecture

Figure 3:
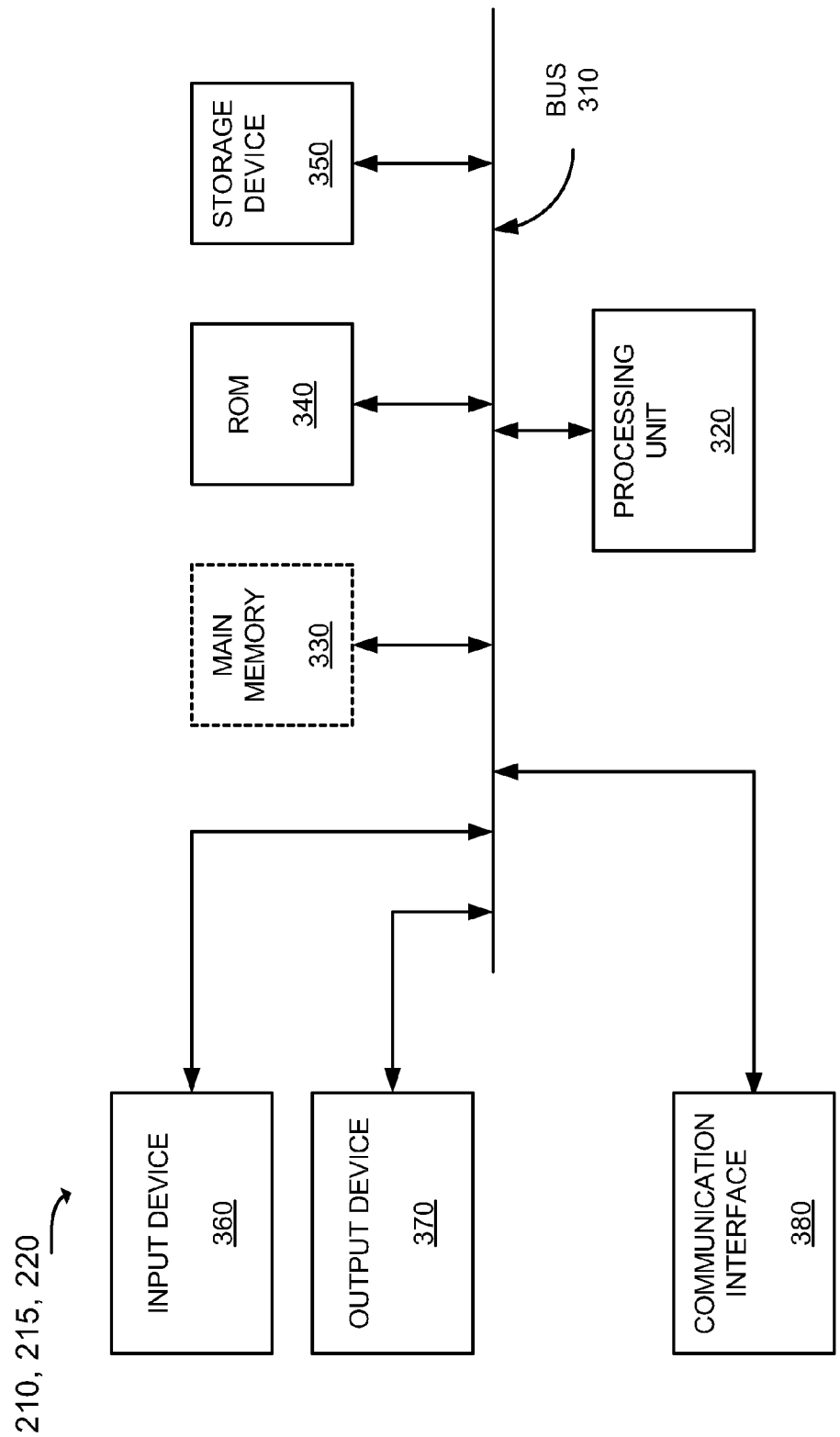
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220 and 215, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or other biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain searching-related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Personalized Document Re-Ranking Process

FIGS. 4A and 4B are flowcharts of an exemplary process for re-ranking the results of an executed document search based on user, or group, preferences consistent with principles of the invention. As one skilled in the art will appreciate, the process exemplified by FIGS. 4A and 4B can be implemented in software and stored on a computer-readable memory, such as main memory 330, ROM 340 or storage device 350 of server 220. In other implementations, the processing exemplified by FIGS. 4A and 4B can be implemented in hardwired circuitry, such as combinational logic, within processing unit 320 of server 220.

The exemplary process may begin with the generation of a document bias set F (act 405 in FIG. 4A). The document bias set F may indicate a user's, or group's, preferred and/or non-preferred documents (e.g., documents 1, 2, 3, 4 and 5). The bias set F may be automatically collected from a query history or browsing history of a user. Bias set F may also be generated by human compilation, or by editing (e.g., of an automatically generated set). Bias set F may further include a set of documents shared, or developed, by a group that may further include a community of users of common interest.

Bias weights ($w_F$) may be generated for each document in bias set F (act 410). The weights may be generated for each document (e.g., documents 1, 2, 3, 4 and 5) of the bias set F based on a user's, or group's, relative preferences among documents of bias set F. For example, the bias set F may include a user's personal most-respected, or most-distrusted, document list, with the weights being assigned to each document in bias set F being based on a relative quantification of the user's preference among each of the documents in the set.

A set L of high quality documents, with corresponding weights ($W_L$), may be obtained (act 415). The set L of high quality documents may be obtained from any existing document ranking algorithm, such as an existing link-based ranking algorithm, that provides a global ranking of document quality (e.g., ranking of all documents across the web) that may be used for ranking the results of searches performed by search engines. The high quality document set L may be derived from the highest-ranking documents in the web as ranked by an existing document ranking algorithm. In one implementation, for example, set L may include the top percentage of the documents globally ranked by an existing document ranking algorithm (e.g., the highest ranked 20% of documents). In an implementation using PageRank, set L may include documents having PageRank scores higher than a threshold value (e.g., documents with PageRank scores higher than 10,000,000). In one implementation, the set of high quality documents may include the substantial entirety of an existing corpus of documents (e.g., substantially all documents aggregated by a document aggregation service) and not just documents obtained from an existing document ranking algorithm. In such an implementation, where the set includes the substantial entirety of an existing corpus of documents, the set may not technically include all "high quality" documents. Weights may be assigned to each document of set L based on a relative ranking of "quality" between the different documents of set L, as determined by the document ranking algorithm.

A search query may be received from a user (act 420). Search engine 225 at server 220 may receive the search query from a user associated with a client 210. Search engine 225 may perform a search of a corpus of documents using the received search query to obtain a ranked set R of search results (act 425). Each document of the ranked set of search results may have a weight ($W_L$) assigned to it by a document ranking algorithm, such as a link-based ranking algorithm or an algorithm that ranks documents based on their relevancy to a set of search terms.

A determination may be made of which documents are common to both the set of high quality documents L and the document bias set F (act 430 in FIG. 4B). Search engine 225 may analyze the content of both sets L and F to determine an intersection set F∩L that includes documents common to both sets. In the implementation in which the set of high quality documents L includes the substantial entirety of a corpus of documents, then the intersection set F∩L would include the documents contained in set F. If there is a link from a document of the determined documents in the intersection set to a result in the set R of search results, then a weight ($W_L$) associated with the result may be adjusted by the document's bias weight $w_F$ (e.g., $W=W_L+w_F$) (act 435). Additionally, if a document in the set R of search results is contained directly in the intersection set (rather than being linked to by a document in the intersection set), then a weight ($W_L$) associated with the result may also be adjusted by the document's bias weight $w_F$ (e.g., $W=W_L+w_F$). Adjustment of the weights assigned to documents in the search result set R may include the use of any type of mathematical function, or combination of functions, such as, for example, using multiplication or other functions, instead of, or in additional to, using just addition alone. In particular, in the situation where document bias set F contains multiple documents with each having a link to a search result, then the weight adjustment may be a function of multiple different weights assigned to the multiple documents in document bias set F.

A ranking of the search results may then be adjusted using the adjusted weights (W) (act 440). The re-ranked results may subsequently be provided to the user that issued the search query.

Exemplary Implementation

Figure 5:
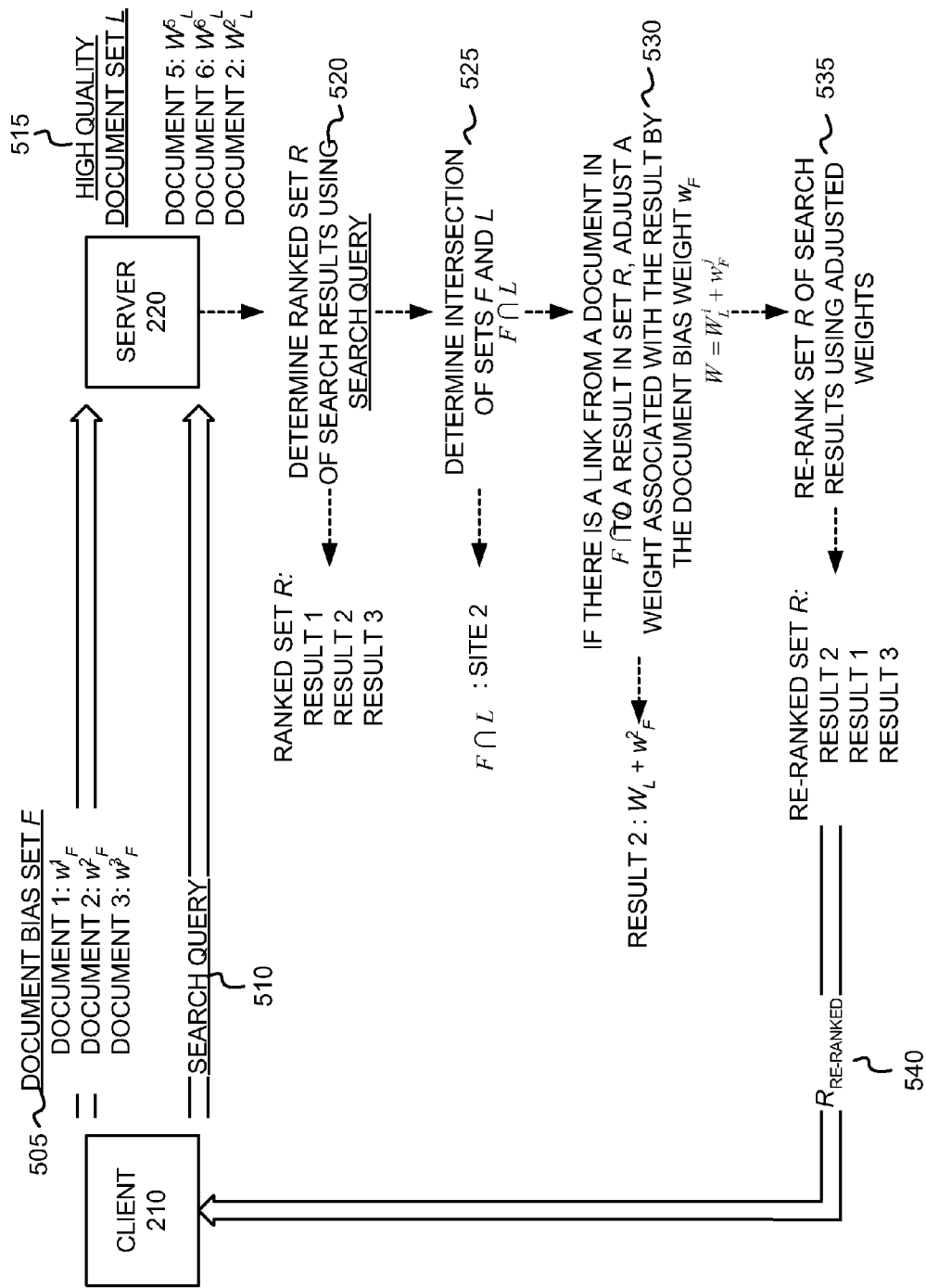
FIG. 5 illustrates an exemplary implementation for personalizing search results using user preferences in conjunction with an existing document ranking mechanism.

FIG. 5 illustrates an exemplary implementation of the use of user preferences for re-ranking search results provided to a user in response to a search query. As shown in FIG. 5, a client 210 may provide a document bias set F 505 to a server 220. Set 505 may include a set of three favorite documents document 1, document 2, and document 3, with corresponding assigned weights $w^1_F$, $w^2_F$ and $w^3_F$. Client 210 may further provide a search query 510 to server 220. Server 220 may obtain a high quality document set L 515 that includes document 5, document 6, and document 2, with corresponding weights $W^5_L$, $W^6_L$ and $W^2_L$. Set L 515 may be obtained from a document ranking algorithm, such as a link-based document ranking algorithm.

Based on search query 510, and existing search techniques, a search engine at server 220 may determine 520 a ranked set R of search results. For simplicity, FIG. 5 depicts ranked set R including three search results: result 1, result 2 and result 3. Each document of the ranked set of search results may have a weight $W_L$ assigned to it by a document ranking algorithm. Server 220 may then determine 525 an intersection set of sets F and L (i.e., F∩L) that includes the documents common to both sets. Since document bias set F 505 includes document 1, document 2 and document 3, and set L 515 includes document 5, document 6 and document 2, server 220 may determine the intersection set F∩L to include document 2.

If there is a link from a document in the intersection set F∩L to a result in set R, then server 220 may adjust 530 the weight associated with that result by the document's bias weight $w_F$. Additionally, if a document from the intersection set F∩L is contained directly in the search result set R, then server 220 may also adjust the weight associated with that result by the document's bias weight $w_F$. In the example shown in FIG. 5, the intersection set F∩L includes document 2, which has a link to result 2 (not shown), and the weight $W_L$ assigned to result 2 by the document ranking algorithm may be adjusted by the weight assigned to document 2 in document bias set F 505 (e.g., $W_L+w^2_F$). Server 220 may re-rank the set of search results using the adjusted weight $W_L+w^2_F$ for result 2. Prior to use of document bias set F 505, the set of search results R were ranked in the order: result 1, result 2 and result 3. However, subsequent to adjusting the weight to result 2, the set of search results R may be ranked in the order: result 2, result 1, result 3. A re-ranked set $R_{re-ranked}$ 540 of search results may be provided to client 210 as a response to search query 510.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4A and 4B, the order of the acts may be modified in other implementations consistent with the principles of the invention. Additionally, non-dependent acts may be performed in parallel.

Aspects of the invention have been described as processing various different types of data (e.g., document sets, document links, document weights, etc.). Such various different types of data may be stored in a data structure on a computer-readable medium, such as, for example, ROM 340, main memory 330 or storage device of a client 210 and/or server 220. Consistent with principles of the invention, a data structure that stores the various types of data may include multiple storage variables or locations in a program module.

In one implementation of the invention, a search engine receiving a search query from a user directly uses the set of bias documents 105 (shown in FIG. 1) to return a set of personalized search results. In another implementation, a client 210 may maintain the document bias set F 105, instead of server 220, and may receive a set of ranked search results from search engine 225 in response to an issued search query. Client 210 may re-rank the received set of search results using weights assigned to the documents in document bias set F 105 maintained at client 210. In this manner, the search results can be personalized without having to reveal the contents of the document bias sets to a search engine or server. Other implementations are also possible, for example, rather than sending a set of bias documents to a search engine, a client could send a set of (external) links from the set of bias documents to the search engine.

While aspects of the invention have been described as adjusting weights associated with documents for use in ranking the documents, the adjusted weights may additionally, or alternatively, be assigned to one or more "sites" that host the various documents. Such "sites" may include a group of documents under common control, such as a group of documents associated with an organization, a domain name, a host name, or a set of documents created by the same person or group of persons. A "site" may also include a group of documents about a particular topic, a group of documents in a particular language, a group of documents hosted in a particular country, or a group of documents written in a particular writing style.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by at least one of one or more server devices, a first set of documents associated with a user,
      documents, in the first set of documents, being assigned weights that reflect a relative quantification of an interest of the user in the documents in the first set of documents;
   receiving, by at least one of the one or more server devices, a search query from a client device associated with the user;
   identifying, by at least one of the one or more server devices and based on the search query, a second set of documents,
      each document from the second set of documents having a respective score;
   determining, by at least one of the one or more server devices, that a particular document, from the second set of documents, matches or links to one of the documents in the first set of documents;
   adjusting, by at least one of the one or more server devices, the respective score of the particular document, to form an adjusted score, based on the weight assigned to the one of the documents in the first set of documents;
   forming, by at least one of the one or more server devices, a list of documents in which documents from the second set of documents are ranked based on the respective scores,
      the particular document being ranked in the list based on the adjusted score; and
   providing, by at least one of the one or more server devices, the list of documents to the client device.

2. The method of claim 1, where adjusting the respective score of the particular document includes:
   adding the weight assigned to the one of the documents in the first set of documents to the respective score of the particular document to form the adjusted score.

3. The method of claim 1, where adjusting the respective score of the particular document includes:
   lowering, based on the weight assigned to the one of the documents in the first set of documents, the respective score of the particular document.

4. The method of claim 1, where identifying the first set of documents includes:
   identifying the first set of documents based on a query history associated with the user.

5. The method of claim 1, where identifying the first set of documents includes:
   receiving, from the user, information identifying the first set of documents.

6. The method of claim 1, where identifying the second set of documents includes:
   identifying the second set of documents further based on a link-based document algorithm.

7. The method of claim 1, where identifying the first set of documents includes:
   identifying the first set of documents based on a first estimation of quality of each document included in a corpus of documents,
      the first estimation of quality of each document being associated with a first community of users,
      the first community of users including the user; and
   identifying the second set of documents based on a second estimation of quality of each document included in the corpus of documents,
      the second estimation of quality of each document being associated with a second community of users,
      the first community of users comprising a sub-community of the second community of users.

8. The method of claim 1, further comprising:
   assigning the adjusted score to one or more sites associated with the particular document.

9. The method of claim 8, where assigning the adjusted score to the one or more sites includes:
   assigning the adjusted score to a group of documents hosted by the one or more sites,
      the group of documents including the particular document, and the group of documents being at least one of:
    associated with a particular organization,
    associated with a particular domain name,
    associated with a particular host name,
    created by a particular person, or
    created by a particular group of persons.
10. The method of claim 1, further comprising:
assigning the adjusted score to a group of documents associated with the particular document,
    the group of documents being at least one of:
        associated with a particular topic,
        written in a particular language,
        written in a particular writing style, or
        associated with a particular location.
11. A system comprising:
one or more server devices configured to:
    identify a first set of documents associated with a user,
        documents, in the first set of documents, being assigned weights that reflect a relative quantification of an interest of the user in the documents in the first set of documents;
    receive a search query from a client device associated with the user;
    identify, based on the search query, a second set of documents,
        each document from the second set of documents having a respective score;
    determine that a particular document, from the second set of documents, matches or links to one of the documents in the first set of documents;
    adjust the respective score of the particular document, to form an adjusted score, based on the weight assigned to the one of the documents in the first set of documents;
    form a list of documents in which documents in the second set of documents are ranked based on the respective scores,
        the particular document being ranked in the list based on the adjusted score; and
    provide the list of documents to the client device.
12. The system of claim 11, where, when adjusting the respective score of the particular document, the one or more server devices are configured to:
    add the weight assigned to the one of the documents in the first set of documents to the respective score of the particular document to form the adjusted score.
13. The system of claim 11, where, when adjusting the respective score of the particular document, the one or more server devices are configured to:
    lower, based on the weight assigned to the one of the documents in the first set of documents, the respective score of the particular document.
14. The system of claim 11, where, when identifying the first set of documents, the one or more server devices are configured to:
    identify the first set of documents based on a query history associated with the user.
15. The system of claim 11, where, when identifying the first set of documents, the one or more server devices are configured to:
    receive, from the user, information identifying the first set of documents.
16. The system of claim 11, where, when identifying the second set of documents, the one or more server devices are configured to:
    identify the second set of documents further based on a link-based document algorithm.
17. The system of claim 11, where, when identifying the first set of documents, the one or more server devices are configured to:
    identify the first set of documents based on a first estimation of quality of each document included in a corpus of documents,
        the first estimation of quality of each document being associated with a first community of users,
            the first community of users including the user; and
    identify the second set of documents based on a second estimation of quality of each document included in the corpus of documents,
        the second estimation of quality of each document being associated with a second community of users,
            the first community of users comprising a sub-community of the second community of users.
18. The system of claim 11, where the one or more server devices are further configured to:
    assign the adjusted score to one or more sites associated with the particular document.
19. The system of claim 18, where, when assigning the adjusted score to the one or more sites, the one or more server devices are configured to:
    assign the adjusted score to a group of documents hosted by the one or more sites,
        the group of documents including the particular document, and
        the group of documents being at least one of:
            associated with a particular organization,
            associated with a particular domain name,
            associated with a particular host name,
            created by a particular person, or
            created by a particular group of persons.
20. The system of claim 11, where the one or more server devices are further configured to:
    assign the adjusted score to a group of documents associated with the particular document,
        the group of documents being at least one of:
            associated with a particular topic,
            written in a particular language,
            written in a particular writing style, or
            associated with a particular location.

* * * * *